United States Patent
Bradley et al.

(10) Patent No.: US 8,109,214 B2
(45) Date of Patent: Feb. 7, 2012

(54) PLATFORM SCREEN DOORS

(75) Inventors: Ross Bradley, Melksham (GB); Derek Tate, Melksham (GB)

(73) Assignee: Knorr-Bremse Rail Systems (UK) Limited, Wiltshire (NL)

(*) Notice: Subject to any disclaimer, the term of this patent is extended or adjusted under 35 U.S.C. 154(b) by 482 days.

(21) Appl. No.: 12/293,231

(22) PCT Filed: Mar. 19, 2007

(86) PCT No.: PCT/GB2007/000991
§ 371 (c)(1),
(2), (4) Date: Feb. 6, 2009

(87) PCT Pub. No.: WO2007/107747
PCT Pub. Date: Sep. 27, 2007

(65) Prior Publication Data
US 2009/0145325 A1    Jun. 11, 2009

(30) Foreign Application Priority Data
Mar. 17, 2006 (GB) .................................. 0605476.1

(51) Int. Cl.
*B61B 1/02* (2006.01)
(52) U.S. Cl. .......................................... 104/28; 105/341
(58) Field of Classification Search ............. 104/27–30; 105/425, 341, 343; 49/13, 14, 31
See application file for complete search history.

(56) References Cited

U.S. PATENT DOCUMENTS

| 4,551,944 A * | 11/1985 | Donaldson ..................... 49/31 |
| 6,398,288 B1 * | 6/2002 | Yuge ........................... 296/146.4 |
| 7,520,426 B2 * | 4/2009 | Hoepken et al. ............. 235/382 |
| 7,677,178 B2 * | 3/2010 | Ellmann et al. ................ 104/28 |
| 7,721,653 B1 * | 5/2010 | Burgess .......................... 104/28 |
| 7,782,175 B2 * | 8/2010 | Stratmann .................... 340/5.61 |

FOREIGN PATENT DOCUMENTS

| WO | WO 2005/007479 A1 | 1/2005 |
| WO | WO 2005/100116 A1 | 10/2005 |
| WO | WO2006/085706 A1 | 8/2006 |

* cited by examiner

*Primary Examiner* — Joe Morano, IV
*Assistant Examiner* — Zachary Kuhfuss
(74) *Attorney, Agent, or Firm* — Barnes & Thornburg LLP

(57) ABSTRACT

An apparatus and method for controlling the operation of a screen door system. The apparatus includes a first transceiver adapted to be mounted on a train, a second transceiver adapted to be mounted on either a train platform or a portion of the platform screen door system. The first and second transceivers are configured to communicate with each other such that when a train is stopped at the train platform within a predetermined distance of and adjacent to a door of the platform screen door system, a signal is transmitted from the first transceiver to the second transceiver to open the door. When passenger embarkation and debarkation is complete, a signal is transmitted from the first transceiver to the second transceiver to close the door, and when the door is closed and locked, a signal is transmitted to the train to depart.

5 Claims, 1 Drawing Sheet

PLATFORM SCREEN DOORS

CROSS-REFERENCE TO RELATED APPLICATIONS

This application is a National Phase Application based upon and claiming the benefit of priority of PCT/GB2007/000991, filed on Mar. 19, 2007 and of British Application No. 0605476.1, filed on Mar. 17, 2006, the contents of both Applications being hereby incorporated herein by reference.

BACKGROUND SUMMARY

The present disclosure relates to a method and apparatus for opening and closing platform screen doors or gates.

The conventional railway station consisting of a raised platform adjacent to the track is essentially the same design as has been used since the beginning of the railway industry in the nineteenth century and is an effective solution to the problem of maximizing passenger boarding speed.

However, the basic platform arrangement suffers from several well known problems, such as passengers falling under trains either deliberately or unintentionally and also litter from passengers falling onto the track. Although incidents of people falling under trains are not common, they result in significant disruption to the network and are traumatic incidents for everyone present. The problem of litter on the track has also increased in recent years and can represent a serious health and safety risk on underground or sub-surface systems where the litter will remain in tunnels until it is cleared up.

Platform screen systems or automated platform gates are well known in the railway industry as one approach of dealing with these problems. Due to the problem of lining up doors on the platform and the train, these systems are usually only installed on lines where the rolling stock is standardized, which in practice is on metro or underground systems, although some dedicated high speed systems are also provided with screens.

In the known platform screen door systems, the operation of the doors is controlled using the signalling system. The signalling system is quite suitable for this as modern systems have great accuracy and are designed for safety critical applications.

However, the use of the signalling system for operating the doors also suffers from a number of problems. In practice, modern signalling systems are complex and prone to faults, which leads to the doors often needing to be operated manually. Additionally, the use of the signalling system makes it very difficult to incrementally retrofit a platform screen door system to a line to be able to operate them.

The present disclosure relates to a method and apparatus for controlling the opening and closing of the doors of a platform screen door system that does not rely on a signalling system.

According to the present disclosure, an apparatus for controlling the operation of a platform screen door system includes a first transceiver adapted to be mounted on a train and a second transceiver adapted to be mounted on a platform or on the platform screen door system. The first and second transceivers, when in use, are adapted to communicate with one another such that when the train is stopped within a predetermined tolerance adjacent to a door of the platform screen door system, the train or the transceiver mounted on the train can request that the platform screen doors open.

According to the present disclosure, a method for controlling the operation of a platform screen door or doors includes the steps of: stopping the train at a train platform within a predetermined tolerance or distance of a platform screen door; providing a first transceiver on the train; providing a second transceiver on the platform or the platform screen door, the transceivers configured to communicate with each other; wherein the train or first transceiver requests that the platform screen door opens and then the doors of the train are opened; when loading and/or unloading is complete, the train or first transceiver requests that the doors be closed, and the second transceiver then transmits a signal that the platform screen door is closed and locked, thereby enabling the train to depart when the platform screen door is closed and locked, and a corresponding signal is transmitted to the train and a flag set to enable the train to depart.

The apparatus and method according to the present disclosure, provides for the train to control the operation of the doors rather than the signalling system. By dispensing with the use of the previously-mentioned signalling system in the control of the doors, the speed of the signals is also advantageously speeded up. The platform screen door system, according to the present disclosure, also permits the control of the screen doors by the driver without requiring any additional actions by the driver.

It is within the scope of the present disclosure that a transceiver is fitted at each door position where a passenger may alight from the train. This not only provides for a degree of redundancy in the system but also ensures that the driver does not open the doors on the wrong side of the train.

Other aspects of the present disclosure will become apparent from the following descriptions when considered in conjunction with the accompanying drawings.

DETAILED DESCRIPTION

Figure 1:
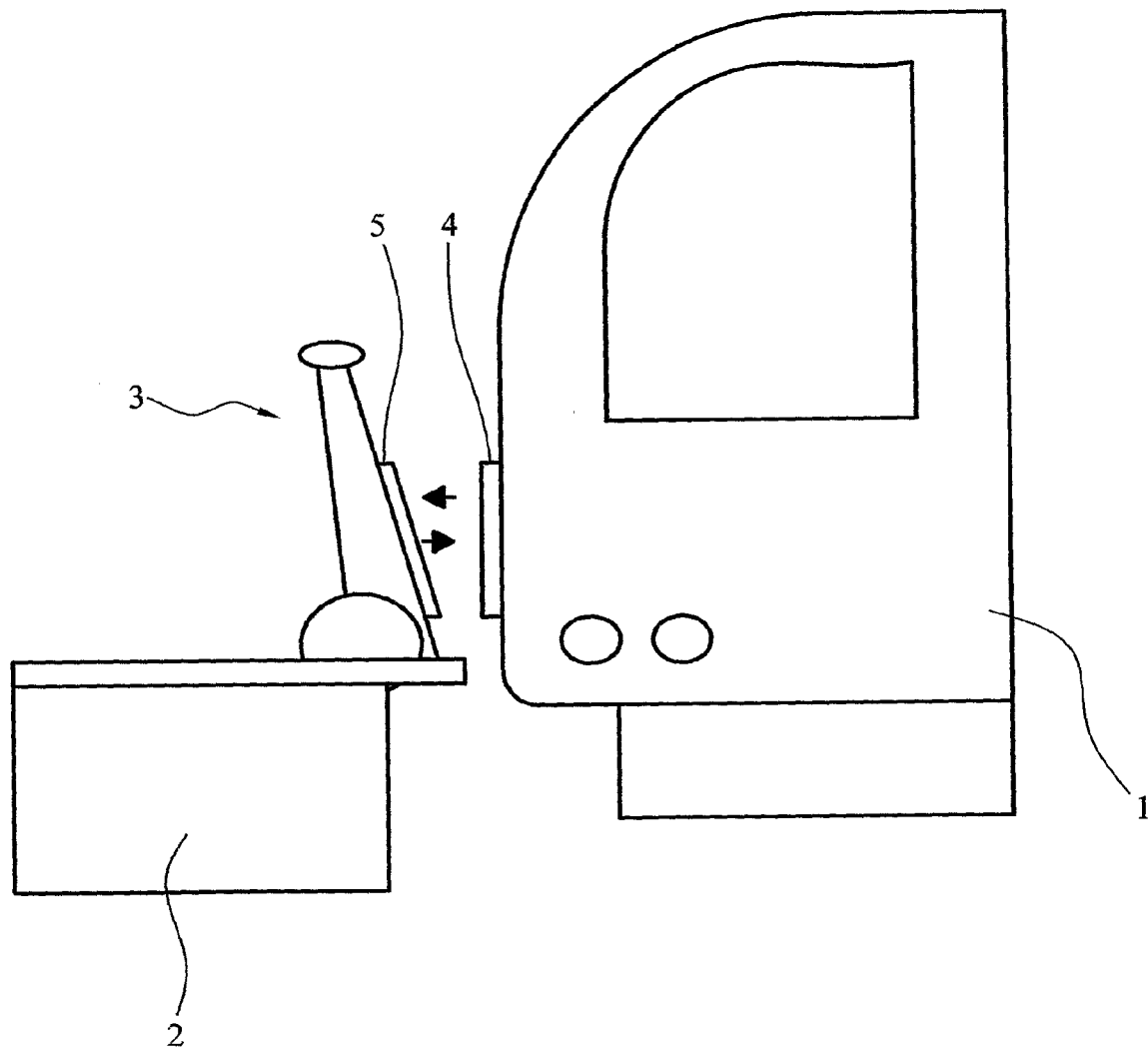
FIG. 1 shows a schematic of a train at a platform and a platform screen door system, in accordance with the present disclosure.

FIG. 1 shows, schematically, a metro train 1 adjacent to a railway platform 2 having a platform screen or platform screen door 3 at the edge of the platform 2 facing the train 1. A first transceiver unit 4 is fixedly mounted on the side of the train 1 and a second transceiver unit 5 is fixedly mounted on the face of the platform screen 3 facing the train 2. The platform screen extends along a length of the platform 2 and has doors at periodic locations corresponding to doors on the trains that stop at the platform. It is within the scope of the present disclosure that the second transceiver unit 5 could, alternatively, be mounted between the rails or above the train on an enclosed or underground railway. However, that could possibly lead to interference and other safety issues. The transceiver units 4, 5 will typically be in the form of an antenna loop and operate at low frequencies, such as, for example, less than 150 kHz to avoid interference with other operators, in particular the signalling equipment. The signal strength is also such that it ensures that the train driver has to stop within a predetermined distance from the platform screen doors 3. The system uses 2.5 channels to facilitate two way communication between the platform 2 and the train 1, with two channels being used for communication and the half channel being used for a carrier signal.

In use, when the train 1 is correctly aligned within a stopping zone in the station, which will, for example, be within about 0.5 m of the ideal position, the first and second transceivers 4, 5 line up and are able to communicate with one another. Once communication between the transceivers 4, 5 is established, the train-side transceiver 4 transmits a door open signal to the platform screen side transceiver 5 and then transmits a door open signal down the train 1, so that the train doors open slightly after but at substantially the same time as the platform doors 3.

Once passenger embarkation and disembarkation is completed, a door close signal is transmitted from the train-side transceiver 4 to the platform screen side receiver 5 and then also down the train, so that the respective doors can be closed. Once the platform doors 3 are closed and locked, a corresponding signal is transmitted to the train 1 so that it may depart the station. This will typically be signalled to the driver by way, for example, of an in cab lamp. The lamp will be driven by the closed and locked signal.

In many existing railway systems an additional problem arises. Due to cost considerations and the impossibility of long term line closures, it is unlikely that an entire line will be fitted with the platform screen door system, according to the present disclosure, at a single time and so it is envisaged that the system will be retrofitted incrementally. In this case, the train 1 cannot receive the closed and locked signal in the same manner as described above as the equipment is not present and it is undesirable to provide the driver with a manual override as this will compromise safety. As the closed and locked signal flag is cancelled by the return message from the platform 2, or second transceiver 5, the platform doors 3 are open. If there are no platform doors 3 on the platform 2, the closed and locked signal is not cancelled. By effectively latching in the closed and locked signal, in the absence of a signal from the platform transceiver 5, the closed and locked signal stays and the train 1 can depart.

The use of the train and platform side transceivers 4, 5, according to the present disclosure, is advantageous as it permits further information such as train operating data, loading and positioning to be exchanged at the platform 2, where it can be passed on to the network operators' own computer network. Similarly, information from other parts of the network can also be passed on to the train and train driver. The train in this case acts a token and the railway as a token ring network. The system according to the present disclosure also has the effect of reducing the load on the signalling equipment, which in turn should prove to be more reliable and faster than in known systems.

In the event that each door 3 on the platform screen door system is equipped with a transceiver 5, it is possible to implement a selective door opening on the train. This is sometimes necessary on some older railway systems, in which the train 1 may be longer than some of the platforms 2 at which it must stop. In a hybrid system, it is within the scope of the present disclosure for the transceivers 4, 5 to communicate with the signalling system, thereby avoiding resignalling the line and also avoiding the need to install monitoring equipment on every platform.

The system and method according to the present disclosure provide a low cost solution to the problem of operating platform screen doors that is suitable for incremental retrofitting to existing railway networks.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. An apparatus for controlling the operation of a screen door system, the apparatus comprising:
   a first transceiver adapted to be mounted on a train;
   a second transceiver adapted to be mounted on one of a train platform and a portion of the platform screen door system; and
   the first and second transceivers being configured to communicate with each other such that when a train is stopped at the train platform within a predetermined distance of and adjacent to a door of the platform screen door system, a signal is transmitted from the first transceiver to the second transceiver to open the door of the platform screen door system, and when passenger embarkation and debarkation is complete, a signal is transmitted from the first transceiver to the second transceiver to close the door of the platform screen door system, and when the door of the platform screen door system is closed and locked a signal is transmitted to the train and a flag is set on the train to enable the train to depart.

2. The apparatus according to claim 1, wherein the transceivers comprise coil antennae.

3. The apparatus according to claim 1, wherein the transceivers communicate with one another at a frequency of less than 150 kHz using 2½ channels.

4. The apparatus according to claim 1, wherein when the signal to open the door is successfully transmitted to the second transceiver, a return signal cancels a closed and locked signal.

5. A method for controlling the operation of a platform screen door, the method comprising the steps of
   providing a platform screen door;
   providing a first transceiver on a train;
   providing a second transceiver on one of a train platform and the platform screen door, the first and second transceivers configured to communicate with each other;
   stopping a train at the train platform within a predetermined distance of the platform screen door;
   transmitting a first signal from the first transceiver, the first signal causing the opening of the platform screen door followed by opening of the train door;
   transmitting a second signal from the first transceiver after passenger embarkation and debarkation is complete, the second signal causing the platform screen door to close;
   transmitting a third signal from the second transceiver signaling that the platform screen door is closed and locked; and
   setting a flag on the train enabling the train to depart from the train platform.

* * * * *